Nov. 23, 1937.　　　H. L. THOMPSON　　　2,099,911
CORN POPPER
Filed Aug. 17, 1936　　　3 Sheets-Sheet 1

Inventor:
Herbert L. Thompson
By: Wm. O. Bell
Attorney

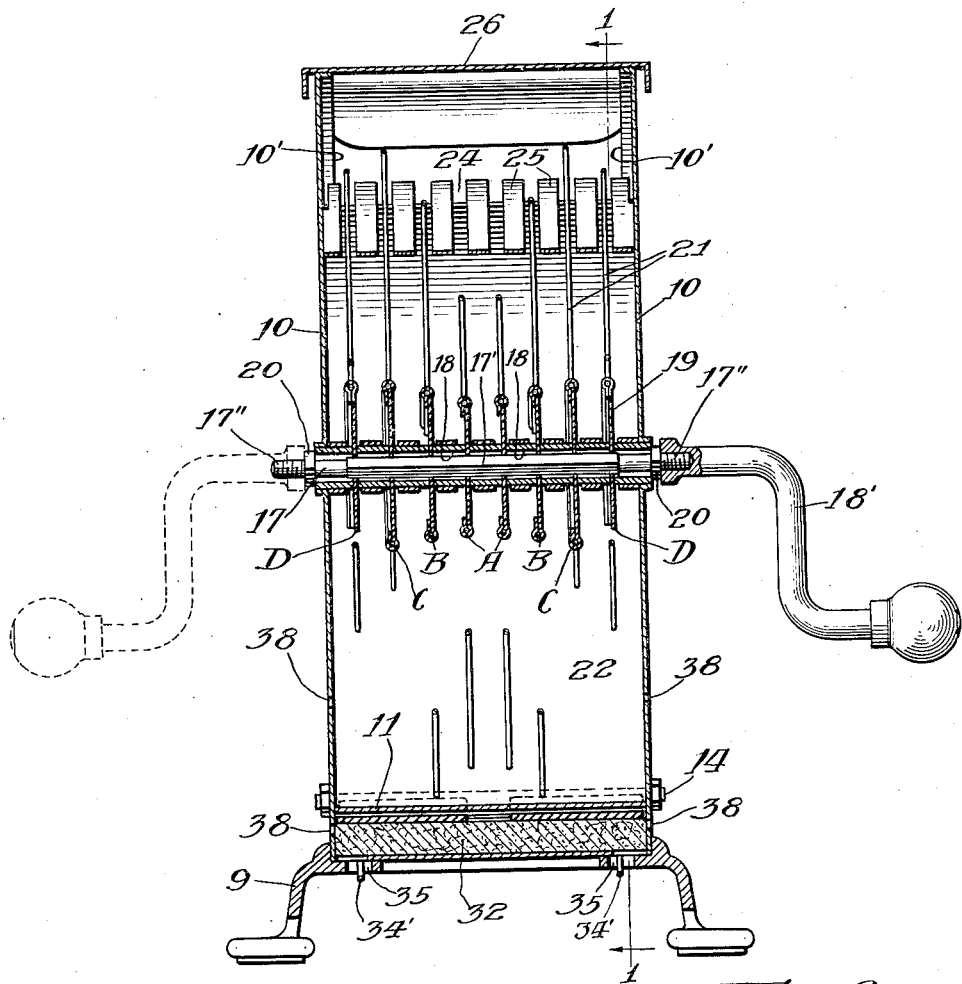
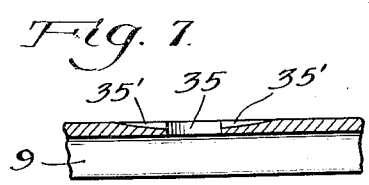
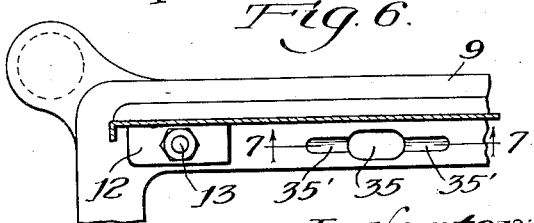

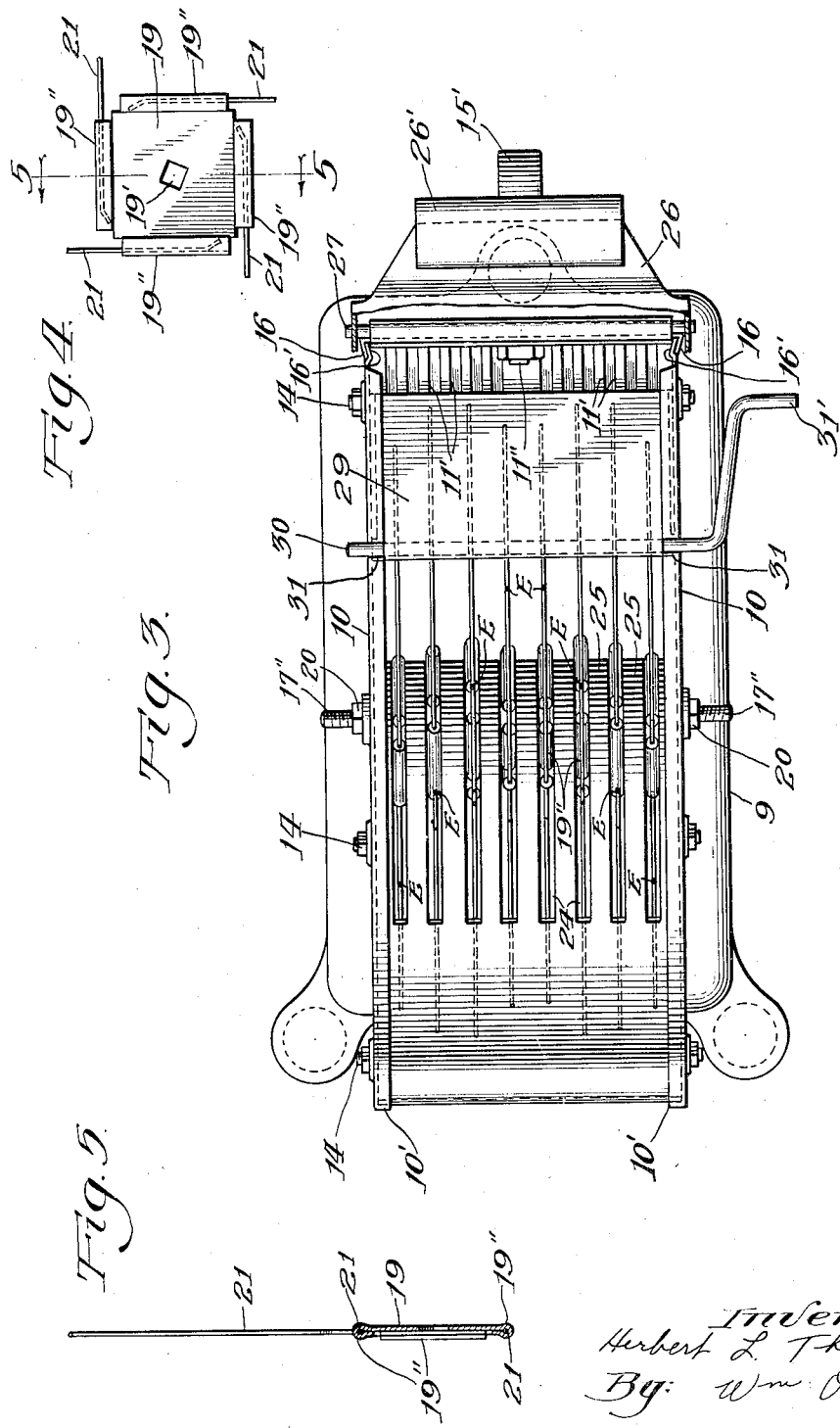

Patented Nov. 23, 1937

2,099,911

UNITED STATES PATENT OFFICE 2,099,911

CORN POPPER

Herbert L. Thompson, Elgin, Ill.

Application August 17, 1936, Serial No. 96,345

17 Claims. (Cl. 53—4)

This invention relates to corn poppers and it has for its object to provide a compact, portable, electrically heated and convenient device of simple construction for popping corn in an efficient manner and with a minimum of effort by the operator.

Another object is to enable the operator to charge the popper with a predetermined quantity of corn and then to deliver the charge into the device in adjacent relation to the heating element.

Another object is to provide means for agitating the corn so that it will not be burned and for elevating and delivering the popped corn as it is popped.

A further object of the invention is to automatically separate the popped corn from the unpopped corn and discharge the popped corn during the popping operation.

And a still further object is to provide means for removably supporting and holding the heating element in operative position in the device so that it can be easily removed and replaced whenever desired.

In the accompanying drawings illustrating a selected embodiment of the invention Fig. 1 is a sectional view on the line 1—1 of Fig. 2;

Fig. 2 is a sectional view on the line 2—2 of Fig. 1;

Fig. 3 is a top plan view with the cover plate broken away;

Fig. 4 is a detail view of one of the finger plates;

Fig. 5 is a detail sectional view on the line 5—5 of Fig. 4;

Fig. 6 is a detail sectional view on the line 6—6 of Fig. 1;

Fig. 7 is a detail sectional view on the line 7—7 of Fig. 6; and

Figures 1, 8:
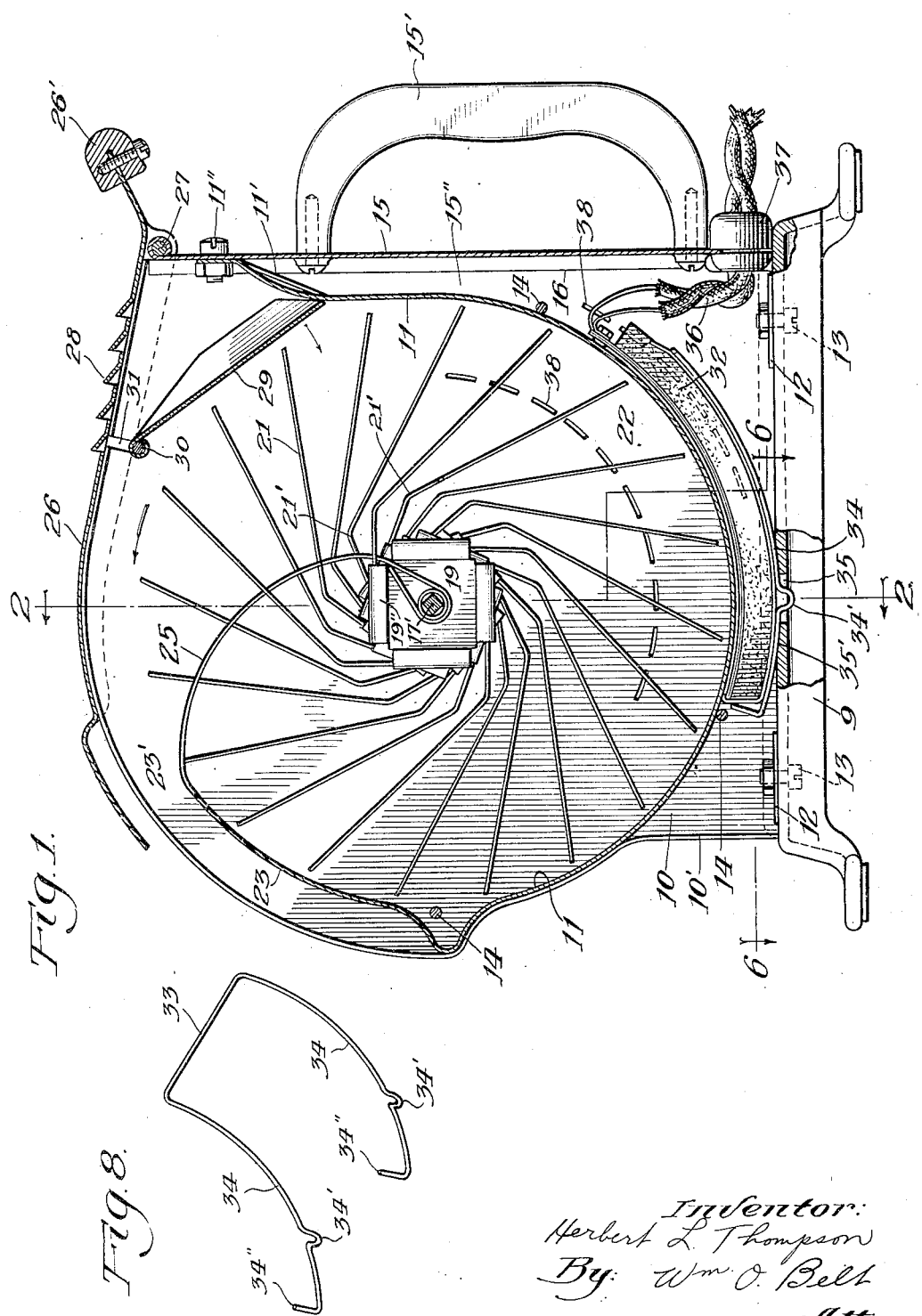
Fig. 8 is a perspective view of the retainer for the heating element.

Referring to the drawings, the device comprises a base 9 having a casing mounted thereon comprising side plates 10 having inturned flanges 10' to receive the body plate 11. The side plates have inturned ears 12 at the bottom to receive screws 13 by which the side plates are secured to the base, and tie bolts 14 pass through the side plates to secure them together upon the body plate. A front plate 15 is provided with side flanges 16 which interlock with flanges 16' on the adjacent edges of the side plates, Fig. 3. A handle 15' is secured to the front plate.

A shaft 17, Fig. 2, having an intermediate rectangular portion 17' extends loosely through a sleeve composed of a plurality of sections 18. The shaft and the sectional sleeve are arranged transversely and substantially centrally of the shell formed by the sides, body and front, and the ends 17" of the shaft project beyond the sides and are threaded to receive a crank handle 18' for operating the shaft and which can be mounted on either end of the shaft. One end of the shaft has a right thread and the other a left thread to receive the handle. This insures that accidental reverse operation of the handle will not turn the shaft reversely but will merely result in unscrewing the handle from the shaft. Plates 19 having rectangular openings 19' are mounted on the shaft between the sections of the sleeve, and nuts 20 on the end portions of the shaft bear against the outside sections of the sleeve and hold the sections of the sleeve and the plates 19 in assembled relation with the plates alternating with the sections and the sections spacing the plates apart.

Each of the plates, Fig. 4, is rectangular in shape and is provided with a flange 19" at each side edge which is clamped upon and secures a finger 21. Each finger is kinked at 21', Fig. 1, adjacent the clamp so that its free end portion is directed rearwardly from its clamped portion. The plates are all of substantially the same size but they are mounted on the rectangular portion 17' of the shaft in staggered relation. I prefer the arrangement shown in the drawings in which the rectangular openings 19' in the pair of plates A, A at the middle of the shaft are aligned and in registration with each other so that the fingers secured thereto are also in alignment. The plates in each successive pair B, B, C, C and D, D, and their openings and fingers, are aligned, but the openings in each successive pair are advanced substantially twenty-two degrees out of registration with the preceding pair. This provides a desirable distribution of the fingers within the casing so that in the operation of the device the corn will be constantly and thoroughly agitated. In the form of the invention illustrated the fingers are in four successive V formations, due to the staggered position of the pairs of plates 19, and this tends to cause an inward movement of the corn, popped and unpopped, away from both side plates. This increases the agitation of the kernels at the bottom of the popping chamber, prevents the popped corn from jamming between the outside fingers and the side plates, and generally facilitates the delivery of the popped corn by keeping it away from the side plates and at the center of the popping chamber.

The body plate is bent inward to form a delivery apron 23 and from the top of this apron the body plate is bent downwardly to form a guard and is engaged with the sectional sleeve of the shaft, being provided with a plurality of parallel slots 24 to receive the fingers. These slots 24 divide the guard into strips 25 which are bent about the sections 18 of the sleeve, Fig. 2. The ends of the fingers travel close to the body plate except at the slotted guard portion and are intended not only to agitate the corn in the popping chamber 22 but also to lift the popped corn up to the upper part of the popping chamber and push it over the guard and discharge it through the opening 23' onto the delivery apron from which it rolls off into any suitable receptacle placed to receive it.

A cover plate 26 is hinged at 27 on the front plate and is provided with an operating handle 26' and with louvers 28. A charge plate 29 is mounted on a shaft 30 which is supported in slots 31 in the sides of the device and is provided with a crank handle 31'. This plate serves the purpose of a charge shelf and is arranged at an angle to the body plate so that when the cover plate is thrown to open position a charge of corn may be deposited in the charge chamber formed by the charge plate, the side plates, the body plate, and the front plate, after which the crank handle 31' is operated to swing the charge plate sufficiently to permit the corn kernels to flow down over the body plate to the bottom of the popping chamber.

A suitable electrical heating element 32 is supported in position on the base close to the body plate and opposite that part of the popping chamber where the corn will ordinarily collect. A convenient means for removably securing the heating element in place consists of a wire retainer 33, Fig. 8, which has two arms 34 provided with kinks 34' and upturned ends 34''. The base is provided with openings 35 and recessed portions 35' leading thereto. The retainer is arranged on the base with the kinks 34' seated in the openings 35 and the arms 34 engaging the recesses 35' in position to receive the heating element 32. This element is provided with conductor wires 36 which pass through an insulation plug 37 secured in the front 15 and are provided with the usual plug (not shown) to be engaged with a socket of an electric circuit. Openings 38 are provided in the sides of the device above the heating element to reduce the cross-sectional area of the side plates. This restricts the conduction of heat from the popping area adjacent the heating element and tends to confine the heat where it is required.

The body plate 11 is provided at the charge chamber with longitudinal slits 11' and the adjacent end of the body plate is fastened to the front plate 15 by bolt 11''. Alternate sections of the body plate between the slits 11' are bent outwardly to provide for the passage of air from the flue-like passage 15'' between the body plate 11 and the front plate 15 into the charging chamber. Thus heat thrown off from the heating element will pass up through the flue-like passage through the openings between the slits and into the charge chamber to preheat the corn therein.

The heating element is normally assembled in place and the device provides a compact, portable popper which can be used in any place where it is convenient to plug in to an electric circuit. The first charge of corn is placed in the charge chamber on the charge plate and the latter is operated to permit the corn to flow down to the bottom of the popping chamber. The heating element may be connected with the electric circuit before or after the charge of corn is introduced into the popping chamber. Another charge of corn may be placed in the charge chamber to be preheated while the first charge of corn is being popped. The crank 18' is turned slowly to cause the fingers to revolve in the popping chamber and agitate the corn until it pops. The fingers are far enough apart so that they will not lift the kernels of corn but when a kernel of corn pops it greatly increases in size and the fingers will carry the popped corn up over the guard and discharge it onto the delivery apron whence it rolls off into a receptacle provided to receive it. The heat provided by the heating element and the constant agitation provided by the fingers causes the corn to pop and prevents it from burning. I prefer to bend the fingers rearwardly in or about the manner shown in Fig. 1, instead of arranging them radially in the casing, because the bent fingers have a trailing movement which causes them to disengage from the popped corn while at the same time they will agitate and lift the corn in the desired manner. The bent fingers will yield readily while being drawn forwardly away from any corn kernels or popped corn that may become stuck or jammed in the device and the following fingers will strike such kernels or popped corn and dislodge them. When the desired amount of corn has been popped the plug may be disconnected so that the heating element will cool. If there are any kernels remaining in the popping chamber they can be removed by rapidly turning the shaft which will cause the fingers to travel at such speed that they will pick up and discharge the unpopped kernels.

I have shown the invention in a form which has been found to be suitable for the purpose but I reserve the right to make any changes in the form, construction and arrangement of parts as fall within the scope of the following claims:

I claim:

1. A corn popper comprising a base, a casing mounted on the base and providing a popping chamber, a heating element supported adjacent to the popping chamber, a guard, a delivery apron, a plurality of fingers arranged in staggered relation within the chamber, and means for revolving the fingers to agitate the corn in the chamber and to lift the popped corn and push it over the guard and discharge it onto said apron.

2. A corn popper comprising a base, a casing mounted on the base and providing a popping chamber, a heating element supported adjacent to the popping chamber, a slotted guard at the top of the popping chamber, a delivery apron, a plurality of fingers within the chamber and operating in the slots of the guard, and means for revolving the fingers to agitate the corn in the chamber and to lift the popped corn and push it over the guard and discharge it onto said apron.

3. A corn popper comprising a base, a casing mounted on the base and providing a popping chamber, a heating element supported adjacent to the popping chamber, a guard, a delivery apron, a plurality of rearwardly bent fingers within the chamber, and means for revolving the fingers to agitate the corn in the chamber and to lift the popped corn and push it over the guard and discharge it onto said apron, said fingers being rearwardly bent to render them readily yieldable upon the jamming of corn in the path of travel of the fingers.

4. A corn popper comprising a casing, a shaft supported in the casing, a plurality of fingers mounted on the shaft within the casing, said fingers being arranged in successive groups with the fingers in each group arranged in V formation, and means for operating the shaft.

5. A corn popper comprising a casing, a shaft supported in the casing, a plurality of rearwardly bent fingers mounted on the shaft within the casing, said fingers being arranged in successive groups with the fingers in each group arranged in V formation, and means for operating the shaft.

6. A corn popper comprising a casing, a shaft supported in the casing, a plurality of fingers, means on the shaft carrying said fingers and arranged in a staggered position on the shaft which distributes the fingers in a plurality of successive V formations, and means for operating the shaft.

7. A corn popper comprising a casing, a shaft supported in the casing, a plurality of fingers, means on the shaft supporting said fingers in pairs with the pairs arranged in different positions axially within the casing, and means for operating the shaft.

8. A corn popper comprising a casing, a shaft supported in the casing, a plurality of fingers, plates mounted on the shaft and carrying said fingers, said plates being arranged in pairs and the pairs in staggered positions to distribute the fingers radially and axially within the casing, and means for operating the shaft.

9. A corn popper comprising a casing, a shaft supported in the casing, a plurality of longitudinal plates mounted on the shaft, clamps at the edges of said plates, fingers secured in said clamps, said plates being disposed peripherally in different positions on said shaft to distribute said fingers radially and axially within the casing, and means for operating the shaft.

10. A corn popper comprising a casing, a shaft mounted in the casing, a plurality of longitudinal plates mounted on the shaft, clamps at the edges of said plates, rearwardly bent fingers secured in said clamps, said plates being disposed peripherally in different positions on said shaft to distribute said fingers radially and axially within the casing, and means for operating the shaft.

11. A corn popper comprising a casing, a shaft mounted in the casing and having a portion square in cross-section, a plurality of rectangular plates mounted on said shaft, clamps at the edges of said plates, fingers secured in said clamps, said fingers being bent beyond their clamps to trail rearwardly and said plates being secured in different rotative positions on the shaft to distribute the fingers radially and axially within the casing, and means for operating the shaft.

12. A corn popper comprising a casing having two sides and a generally cylindrical body, said body having an opening therein and being depressed below said opening to form a delivery apron within said casing, and operating means within the casing to discharge popped corn through said opening and onto said apron.

13. A corn popper comprising a casing having two sides and a generally cylindrical body, said body having an opening therein and being depressed below said opening to form a delivery apron within said casing, a slotted guard extending from the upper end of said apron within the casing, an agitator comprising a plurality of fingers arranged to travel through the slots in the guard, and means for revolving the agitator to lift popped corn and discharge it through said opening onto said apron.

14. A corn popper comprising a base having an opening therein, a casing mounted on the base and providing a popping chamber, a heating element, and a wire retainer removably holding the heating element and detachably engaged with said opening.

15. A corn popper comprising a casing having two sides and a generally cylindrical body with an opening therein, a heating element, and means for supporting the heating element adjacent the bottom of the casing, the sides of the casing being provided with openings to reduce the cross-sectional area of the sides and restrict the conduction of heat therein from the heating element.

16. A corn popper comprising a casing having a popping chamber, a movable cover plate, and a movable charge plate within the casing beneath the cover plate to receive a charge of corn to be popped.

17. A corn popper comprising a generally cylindrical casing, a heating element supported at the bottom of the casing, an agitator within the casing, a charge chamber at the top of said casing comprising a movable charge plate and a movable cover plate, and means for operating the agitator.

HERBERT L. THOMPSON.